United States Patent [19]

Smith, Jr.

[11] 4,280,576
[45] Jul. 28, 1981

[54] LOW PROFILE TENSION MOUNTED LOAD CELL INDUSTRIAL SCALE

[76] Inventor: James L. Smith, Jr., 316 W. 12th St., Grand Island, Nebr. 68801

[21] Appl. No.: 55,886

[22] Filed: Jul. 9, 1979

[51] Int. Cl.³ .......................................... G01G 19/02
[52] U.S. Cl. .................... 177/126; 177/134; 177/DIG. 9
[58] Field of Search ......... 177/134, 133, 132, DIG. 9, 177/260, 126

[56] References Cited

U.S. PATENT DOCUMENTS

| 1,249 | 7/1839 | Brainerd . | |
|---|---|---|---|
| 922,648 | 5/1909 | Wheeler . | |
| 2,962,276 | 11/1960 | Thurston | 177/134 X |
| 3,103,984 | 9/1963 | Ellis . | |
| 3,258,078 | 6/1966 | Crone . | |
| 3,299,976 | 1/1967 | Boadle | 177/134 |
| 3,472,329 | 10/1969 | Smith | 177/132 X |
| 3,797,593 | 3/1974 | Conley | 177/134 |
| 3,966,001 | 6/1976 | Goldberg | 177/133 X |
| 4,010,811 | 3/1977 | Muccillo | 177/DIG. 9 |
| 4,066,140 | 1/1978 | Conley | 177/134 |
| 4,088,198 | 5/1978 | Wirth | 177/DIG. 9 |

FOREIGN PATENT DOCUMENTS 2075778  5/1976  U.S.S.R. ................................. 177/126

*Primary Examiner*—Joseph W. Hartary
*Attorney, Agent, or Firm*—Henderson & Sturm

[57] ABSTRACT

An industrial scale including a plurality of tension mounted load cells disposed along and spaced outwardly from the longitudinal side of the weighing platform. Retractable support structures are spaced along the longitudinal sides of the weighing platform and when in the extended position such support structures are connected to the lower ends of load cells which depend from platform mounting brackets.

3 Claims, 5 Drawing Figures

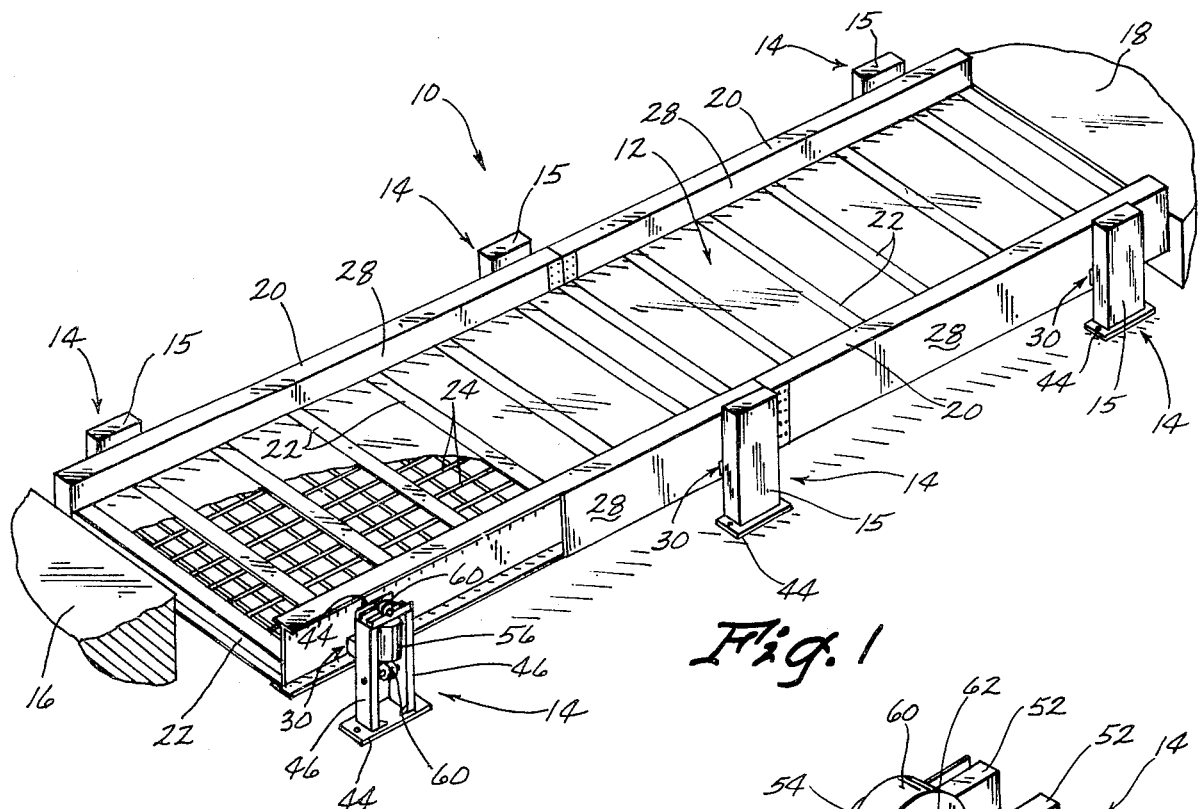

LOW PROFILE TENSION MOUNTED LOAD CELL INDUSTRIAL SCALE

BACKGROUND OF THE INVENTION

The present invention relates generally to industrial scales for trucks, railcars or the like, and more particularly, to an industrial scale utilizing tension mounted load cells.

Large, heavy duty industrial scales typically utilize weighing platforms interconnected to a number of ground engaging mounts spaced beneath the weighing platform. The ground engaging mounts support strain gauges or load cells which in turn support the weight at the weighing platform and the object to be weighed. Signals from the strain gauges or load cells proportional to the load are transmitted to an instrument and weights are indicated thereon.

One of the problems associated with the installation and use of large industrial scales is the extensive excavation required to accommodate the working structure of the scale and/or the degree of incline of the approach and exit ramps adjacent the weighing platform. Another problem associated with the use of large industrial scales is the problem of side loading caused by movement of vehicles onto and off of the weighing platform. Those concerned with these problems recognize the need for an improved industrial scale.

SUMMARY OF THE INVENTION

The instant invention includes a weighing platform having retractable support structures which can be retracted into the body of the weighing platform to reduce overall width of the platform when in transit from the point of assembly to the point of installation. The support structures are then extended to engage the load cells depending from the platform mounting brackets at the time of installation of the entire scale structure.

The mounting brackets are spaced away from the longitudinal sides of the platform allowing the scale platform to rest at an elevation near the lowest elevation of the entire structure. This results in a truly low profile structure that overcomes the problems in installation and use associated with other scales. Further, the load cells are interconnected between the mounting brackets and platform in a manner which allows slight horizontal movement of the platform.

An object of the present invention is the provision of an improved industrial scale.

Another object is to provide an industrial scale wherein a structure of maximum width can be transported from the point of manufacture to the point of installation.

A further object of the invention is the provision of an industrial scale having a low profile platform.

Still another object is to provide an industrial scale that effectively overcomes the problem of side loading.

A still further object is to provide an industrial scale that is easy to install and maintain. Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of the scale of this invention having portions cut away to better show the structure;

FIG. 2 is an enlarged perspective view showing the ground engaging platform mounting bracket and the connection of the load cell between the mounting brackets and the platform;

FIG. 3 is a perspective view of the retractable clevis structure having portions cut away;

DESCRIPTION OF THE PREFERRED EMBODIMENTS

Figure 5:
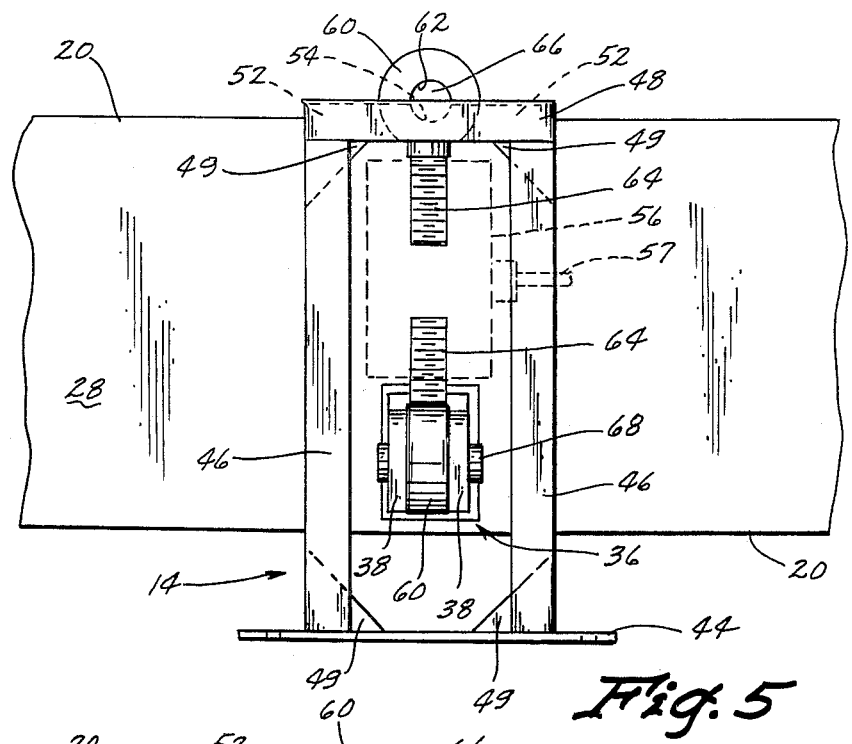
FIG. 5 is a side elevational view of the structure shown in FIG. 2.

Referring now to the drawings, wherein like reference numerals designate identical or corresponding parts throughout the several views. FIG. 1 shows an industrial scale 10. The scale 10 includes a platform 12, ground engaging platform mounting structures 14 spaced outwardly from the longitudinal sides of platform 12, and approach and exit pads 16 and 18. The platform 12 includes a pair of horizontally disposed parallel beams 20 interconnected by transverse beams 22 which rest on the lower flanges of parallel beams 20 and are rigidly attached thereto by weldment or the like. A matrix of reinforcing bars 24 are attached intermediate the flanges of transverse beams 22 and parallel beams 20 and a concrete floor 26 is disposed flush with the top and bottom flanges of transverse beams 22. Metal plates 28 are secured by welding to the parallel beams 20 to form a box-like structure.

Figure 4:
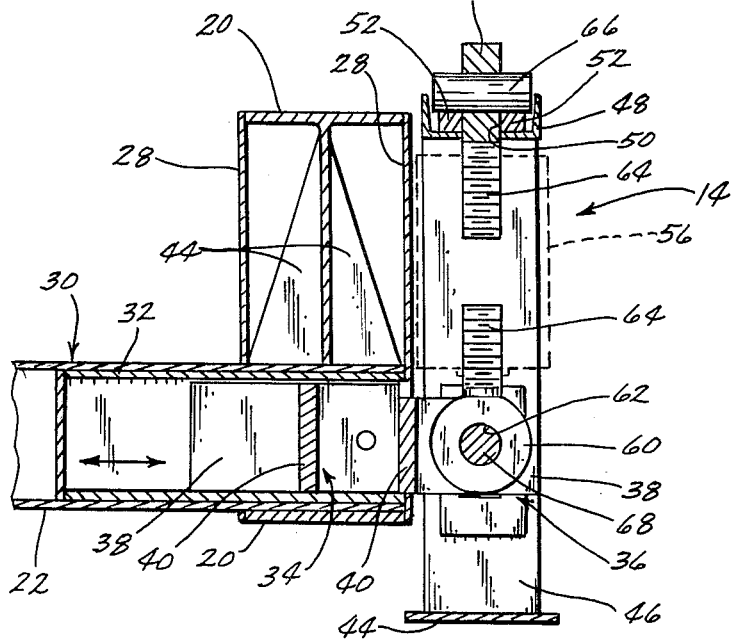
FIG. 4 is an enlarged sectional view taken along line 4—4 of FIG. 1.

The platform 12 carries a plurality of pairs of retractable clevis structures 30 as best shown in FIGS. 3 and 4. Each pair of retractable clevis structures 30 are attached to opposite ends of one of the transverse beams 22 and include a cylindrical chamber 32 welded to the transverse beam 22 intermediate the flanges thereof and disposed adjacent to one side of the web thereof. The chamber 32 extends through the webs of parallel beams 20 and has an open end terminating at plate 28 as shown in FIG. 4. The chamber 32 is adapted to slideably receive an elongated support bar 34.

The elongated support bar 34 includes a clevis 36 formed at the outer end thereof. The support bar 34 is formed by two counter opposing plates 38 spaced apart and interconnected by two webs 40. The clevis 36 is defined by the U-shaped structure including the outer web 40 and the outer ends of support bar 34 which outer ends have counter opposing openings 42 formed therein.

The bar 34 is moveable between a first retracted position wherein the clevis 36 is disposed within the chamber 32 and a second extended position wherein the clevis 36 is disposed outwardly of the chamber 32 and outwardly of the metal side plate 28 as best shown in FIG. 4. When in the second extended position, approximately two-thirds of the length of the elongated support bar 34 is disposed within chamber 32 and the entire platform 12 is carried by the engagement of the support bar 34 within the chamber 32. Braces 44 are attached by welding to the web of beam 20 above the chamber 32 and to the top of chamber 32 to reinforce the retractable clevis structure 30.

A plurality of ground engaging platform mounting structures 14 and disposed in pairs at opposite sides of the platform 12 as shown in FIG. 1. A cover 15 is secured over the mounting structure 14 for protection of the structure. As best shown in FIGS. 2 and 5, the platform mounting structure 14 includes a ground engaging support base 44 which is attached to a suitable concrete footing (not shown). A pair of channel columns 46 extend upwardly from base 44 and are interconnected at their upper ends by top channel beam 48. Gussets 49 reinforce and stabilize the mounting structure 14. The top channel beam 48 has a central opening 50, and a pair of elongated support bars 52 are attached to the top beam 48 and disposed on opposite sides of central opening 50. The support bars 52 have semi-circular recesses 54 formed in the upper surfaces thereof adjacent to the central opening 50.

Each platform mounting structure 14 is interconnected to each clevis 36 by a tension mounted load cell 56 as most clearly shown in FIGS. 2, 4 and 5. Connectors 58 include an eye member 60 having an opening 62 and a threaded shaft 64 extending normal to the axis of the opening 62. The threaded shafts 64 are threadable connected to the upper and lower ends of the load cell 56 such that the plane of the upper eye member 60 is normal to the plane of the lower eye member 60.

The upper eye member 60 is inserted upwardly through the central opening 50 in the top channel beam 48 and connecting pin 66 is inserted into and through opening 62 such that the outer ends of pin 66 contact and are supported by the semi-circular recesses 54 of support bars 52. Thus, the axis of pin 66 extends horizontally in a direction transverse to the platform 12.

The lower eye member 60 is inserted within the clevis 36 such that the openings 42 register with opening 62 and connecting pin 68 is inserted therethrough. The axis of pin 68, therefore, extends horizontally in a direction longitudinal to the platform 12.

The entire weight of the platform 12 and the object to be weighed is applied to the load cells 56 in tension while allowing for slight horizontal movement of platform 12 in any direction. Each of the load cells 56 interconnecting the six platform mounting structures 14 shown in FIG. 1 generate an electrical signal in response to the load and such signal is transmitted through conductors 57 to an instrument (not shown) which totals the signals and indicates the total load applied to all load cells 56.

Thus it can be seen that a novel industrial scale has been provided which accomplishes at least all of its stated objectives.

Obviously, many modifications and variations of the present invention are possible in light of the above teachings. It is therefore to be understood that, within the scope of the appended claims, the invention may be practiced otherwise than as specifically described.

I claim:

1. An industrial scale comprising:
   a platform for supporting an object to be weighed, said platform including a pair of horizontally disposed parallel beams and a plurality of transverse beams attached to and interconnecting said parallel beams;
   a plurality of pairs of retractable clevis structures, each pair of said clevis structures being attached to the opposite ends of one of said transverse beams and extending through the webs of said parallel beams, each of said clevis structures including a cylindrical chamber attached to said transverse beam intermediate the flanges thereof, said chamber having an open end terminating in the vertical plan defined by the outer edges of the flanges of said parallel beam, and an elongated support bar disposed in mating relationship within said chamber, said support bar including a clevis disposed at the outer end thereof, said support bar being moveable between a first retracted position wherein said clevis is disposed within said chamber and a second extended position wherein said clevis is disposed outwardly of the cylindrical chamber and the outer edges of the flanges of said parallel beam;
   a plurality of ground engaging platform mounting brackets disposed outwardly from the longitudinal edges of said parallel beams, including:
      a ground engaging support base;
      a pair of horizontally spaced parallel channel columns extending upwardly from said base normal thereto;
      a top channel beam having a central opening formed therein, said top channel beam being attached to and interconnecting said parallel channel columns; and
      a pair of parallel elongated support bars attached to the top of said top channel beam at the longitudinal sides thereof and disposed on opposite sides of said central opening, said support bars having semi-circular recesses formed in the upper surface thereof adjacent to said central opening; and,
   a plurality of tension mounted load cells attached at the upper end to said platform mounting bracket and attached at the lower end to said clevis when said support bar is in said second extended position, consisting of:
      an upper connector including an eye member having an opening and a threaded shaft extending normal to the axis of said opening, said threaded shaft being threadably connected to the upper end of said load cell and extending through and below said central opening in said top channel beam, said eye member opening having a pin of circular cross-section received within and extending beyond both sides of said upper connection, said pin having outer ends contacting and supported by the semi-circular recesses of said support bars, whereby said load cell depends directly downward from the central opening in said top channel beam of said platform mounting brackets; and
      a lower connector including an eye member having an opening and a threaded shaft extending normal to the axis of said opening, said threaded shaft being threadably connected to the lower end of said load cell, said eye member opening having a pin received within and extending beyond both sides of said lower connector, said pin having outer ends received within counter opposing openings in said clevis, whereby the entire weight of the platform and object to be weighed is applied to the load cell in tension.

2. The industrial scale of claim 1 wherein the axis of the opening of said upper connector extends horizontally in a direction transverse to said platform and the axis of the opening of said lower connector extends horizontally in a direction longitudinal to said platform.

3. The industrial scale of claim 1 wherein the pin attaching the lower connector to the clevis is circular in cross-section.

* * * * *